United States Patent
Kim et al.

(10) Patent No.: US 10,427,291 B2
(45) Date of Patent: *Oct. 1, 2019

(54) MOVING ROBOT AND CONTROL METHOD THEREOF

(71) Applicant: LG ELECTRONICS INC., Seoul (KR)

(72) Inventors: Hwang Kim, Seoul (KR); Sungil Park, Seoul (KR); Soohyun Kim, Daejeon (KR); Byungho Yoon, Daejeon (KR); Sanghoon Han, Daejeon (KR); Youngjun Jeon, Daejeon (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/238,796

(22) Filed: Jan. 3, 2019

(65) Prior Publication Data

US 2019/0152045 A1 May 23, 2019

Related U.S. Application Data

(63) Continuation of application No. 15/436,189, filed on Feb. 17, 2017.

(30) Foreign Application Priority Data

Feb. 22, 2016 (KR) .......................... 10-2016-0020792

(51) Int. Cl.
*B25J 5/00* (2006.01)
*A47L 11/40* (2006.01)
(Continued)

(52) U.S. Cl.
CPC ........... *B25J 5/005* (2013.01); *A47L 11/4011* (2013.01); *A47L 11/4061* (2013.01);
(Continued)

(58) Field of Classification Search
CPC .... B25J 11/0085; B25J 11/0075; B25J 5/005; B62D 55/075; B62D 57/024;
(Continued)

(56) References Cited

U.S. PATENT DOCUMENTS

| 4,566,551 | A | * | 1/1986 | Feliz | ..................... | A61G 5/061 |
| | | | | | | 180/9.1 |
| 5,316,381 | A | * | 5/1994 | Isaacson | .............. | B62D 55/305 |
| | | | | | | 305/145 |

(Continued)

FOREIGN PATENT DOCUMENTS

| JP | 2007-244722 | 9/2007 |
| JP | 4704637 | 6/2011 |

(Continued)

OTHER PUBLICATIONS

U.S. Notice of Allowance dated Jan. 17, 2019 issued in U.S. Appl. No. 15/436,189.

(Continued)

*Primary Examiner* — Rachid Bendidi
(74) *Attorney, Agent, or Firm* — KED & Associates, LLP (57) ABSTRACT

A moving robot includes a main body, a drive assembly moving the main body, and a cleaner head performing cleaning on a cleaning area in which the main body is positioned, wherein the drive assembly includes a plurality of pulleys, a motor connected to any one of the plurality of pulleys and generating a driving force, a belt rotated in contact with the plurality of pulleys, and a support shaft connected to some of the plurality of pulleys and changing a position of the pulley such that an area in which the belt is in contact with a ground or an obstacle is maintained to be equal to or greater than a reference area.

7 Claims, 6 Drawing Sheets

(51) Int. Cl.
*B25J 11/00* (2006.01)
*B62D 55/075* (2006.01)
*B62D 57/024* (2006.01)

(52) U.S. Cl.
CPC ........ *B25J 11/0075* (2013.01); *B25J 11/0085* (2013.01); *B62D 55/075* (2013.01); *B62D 57/024* (2013.01); *A47L 2201/04* (2013.01); *Y10S 901/01* (2013.01)

(58) Field of Classification Search
CPC .............. A47L 11/4061; A47L 11/4011; A47L 2201/04; Y10S 901/01
See application file for complete search history.

(56) References Cited

U.S. PATENT DOCUMENTS

| | | | | |
|---|---|---|---|---|
| 6,267,196 B1 * | 7/2001 | Wilcox | ................ | B60K 17/342 180/209 |
| 9,259,129 B2 * | 2/2016 | Jang | ....................... | A47L 9/2805 |
| 2013/0199859 A1 * | 8/2013 | Inoue | .................... | B60F 3/0015 180/9.26 |
| 2014/0216836 A1 * | 8/2014 | Davies | ................... | B62D 55/06 180/164 |

FOREIGN PATENT DOCUMENTS

| | | |
|---|---|---|
| JP | 2013-045463 | 3/2013 |
| KR | 20-1997-0003531 | 4/1997 |
| KR | 10-1109545 | 1/2012 |
| KR | 10-1530704 | 6/2015 |

OTHER PUBLICATIONS

Korean Notice of Allowance dated Apr. 14, 2017 issued in Application No. 10-2016-0020792.

International Search Report dated May 29, 0217 issued in Application No. PCT/KR2017/001760.

* cited by examiner

MOVING ROBOT AND CONTROL METHOD THEREOF

CROSS-REFERENCE TO RELATED APPLICATION(S)

This application is a Continuation of U.S. application Ser. No. 15/436,189, filed Feb. 17, 2017, which, pursuant to 35 U.S.C. § 119(a), claims the benefit of earlier filing date and right of priority to Korean Application No. 10-2016-0020792, filed in Korea on Feb. 22, 2016, the contents of each of which is incorporated by reference herein in its entirety.

BACKGROUND

1. Field

The present disclosure relates to a moving robot and a control method thereof, and particularly, to a moving robot capable of passing through an obstacle and a control method thereof.

2. Background

In general, robots have been developed for industrial purposes and have been in charge of part of factory automation. Recently, robot-applied fields have further extended to develop medical robots or aerospace robots, and home robots that may be used in general houses have also been made.

A typical example of a home robot is a robot cleaner, which may be a home appliance that cleans by sucking ambient dust or foreign objects, while traveling in a predetermined area. Such a robot cleaner may include a generally rechargeable battery and have an obstacle sensor capable of avoiding an obstacle during traveling so that the robot cleaner may perform cleaning while traveling.

Recently, beyond performing cleaning while robot cleaners are simply autonomously traveling in a cleaning area, research into utilization of robot cleaners in various fields such as healthcare, smart home, remote control, and the like, has been actively conducted. When a robot cleaner performs autonomous traveling in a cleaning area, the robot may meet various obstacles present in the cleaning area, and thus, an algorithm for avoiding such obstacles when performing autonomous traveling and cleaning operation may be required.

However, when a bottom surface of the cleaning area is not even, if all surface portions which are not even are recognized as obstacles, a cleaning range may be reduced, and thus, a recognition reference related to an obstacle may not be set too strictly. Thus, when the robot cleaner passes through a portion of the bottom surface without recognizing an uneven portion of the bottom surface as an obstacle, at least one of a plurality of wheels may not come into contact with the bottom surface, generating idle rotation, making it impossible for the robot cleaner to normally travel.

Also, when at least one of the plurality of wheels of the robot cleaner is completely arrested, the arrested state of the wheel may not be released only by an output from a motor.

Thus, a robot cleaner that solves an idle rotation phenomenon and a complete arrest phenomenon of the wheel that may occur when the robot cleaner passes on bottom surfaces of various conditions and a control method thereof may be required.

A robot cleaner may have various types of driving devices and traveling performance of a robot cleaner may be varied according to types of the driving unit. A robot cleaner may have a main driving wheel connected to a separately operable motor and an auxiliary driving wheel minimizing a frictional contact between a lower surface of a main body and a floor surface (cleaning target surface). The main driving wheel and auxiliary driving wheel of the driving device used in a robot cleaner may have a circular shape.

A case in which a caterpillar having a circular shape is applied to a robot cleaner has been introduced. A robot cleaner having such a caterpillar type driving unit may be suitable for traveling on an uneven floor surface. However, when the robot cleaner employing the caterpillar meets an obstacle as a target to be passed such as a threshold, the robot cleaner may not properly pass through the obstacle and the driving unit may be arrested by the obstacle.

In particular, due to an irregular portion of the floor surface, a rear surface of the robot may be in contact with the floor surface and the driving unit may idly rotate in a floating state. In a robot described in Korean Patent Registration No. 10-1530704, an angle between left and right auxiliary caterpillar modules and left and right main caterpillars may be changed to correspond to a height or a slope of an obstacle to secure a frictional force regarding the obstacle by the left and right auxiliary caterpillars.

However, in the related art robot, it may not be possible to secure a frictional force regarding an obstacle only by the main caterpillar, and an auxiliary caterpillar installed on a side surface of the main caterpillar may be required. Thus, manufacturing cost of the robot to install the auxiliary caterpillar may be increased, and since separate power should be supplied to the auxiliary caterpillar, efficiency of power consumed in the robot may be reduced.

Also, since the auxiliary caterpillar is added, a weight of a main body of the robot may be increased to cause user inconvenience. When a frictional force regarding an obstacle is secured using the auxiliary caterpillar as in the related art robot, a width of the main body of the robot may be excessively increased to make it more difficult for the robot to pass through an obstacle than a robot without such an auxiliary caterpillar.

Also, when the related art robot passes over an obstacle, only power transmitted to the auxiliary caterpillar may be used and idle rotation still may occur in the main caterpillar. The above references are incorporated by reference herein where appropriate for appropriate teachings of additional or alternative details, features and/or technical background.

BRIEF DESCRIPTION OF THE DRAWINGS

Embodiments will be described in detail with reference to the following drawings in which like reference numerals refer to like elements, and wherein.

DETAILED DESCRIPTION

Description will now be given in detail of the exemplary embodiments, with reference to the accompanying drawings. For the sake of brief description with reference to the drawings, the same or equivalent components will be provided with the same reference numbers, and description thereof will not be repeated.

Figure 1A:
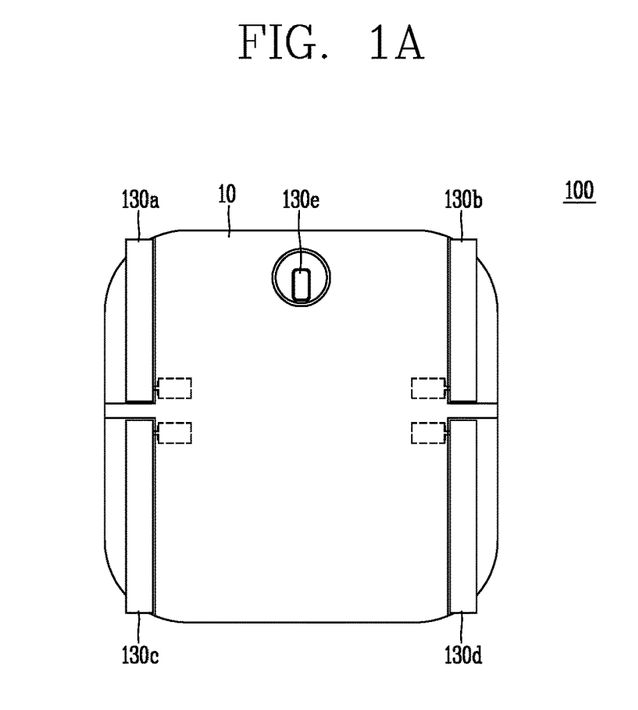
FIG. 1A is a conceptual view illustrating a rear surface of a moving robot according to an embodiment of the present disclosure.

Referring to FIG. 1A, a moving robot 100 may include a main body 10 prepared to be movable. For example, when the moving robot 100 is a robot cleaner, the main body 10 may include a cleaning unit (or vacuum) generating a suction force.

A driving unit capable of moving the main body 10 in a desired direction and rotating the main body 10 may be provided in the main body 10. The driving unit may include a plurality of rotatable wheels, and each of the wheels may be separately rotated and the main body 10 may be rotated in a desired direction. In detail, the driving unit may include at least one main driving wheel 130a, 130b, 130c, and 130d, and auxiliary wheel 130e. For example, the main driving wheel may be installed on a lower surface of the main body 10.

Figure 1B:
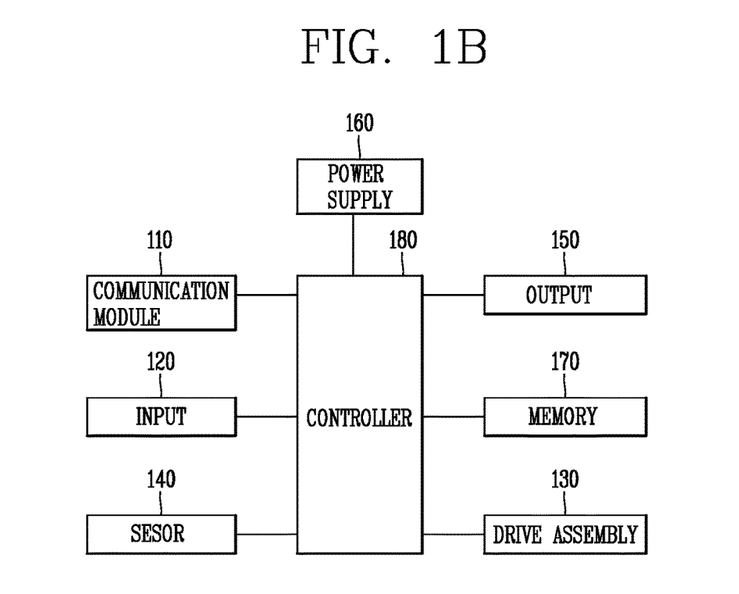
FIG. 1B is a block diagram illustrating components of a moving robot according to an embodiment of the present disclosure.

As illustrated in FIG. 1B, a moving robot according to an embodiment of the present disclosure may include at least one of a communication unit or module 110, an input unit (or input) 120, a driving unit (or drive) 130, a sensing unit (or sensor) 140, an output unit (or output) 150, a power supply unit (or power supply) 160, a memory 170, and a controller 180, and a combination thereof. The components illustrated in FIG. 1B are not essential and a robot cleaner having fewer or greater components may be implemented. Hereinafter, the components will be described.

The power supply unit 160 may include a battery that can be charged by an external commercial power source and supplies power to the moving robot. The power supply unit 160 may supply driving power to each component included in the moving robot to supply operation power required for the moving robot to travel or perform a specific function.

The controller 180 may sense a remaining power capacity of the battery, and when the remaining power capacity is insufficient, the controller 180 may control the moving robot to move to a charging station connected to an external commercial power source and charge the battery upon receiving a charge current from the charging station. The battery may be connected to a battery sensing unit (or battery sensor) and a remaining battery capacity and a charge state may be transferred to the controller 180. The output unit 150 may display a remaining battery capacity on a screen by the controller.

The battery may be positioned at or in a lower portion of the center of the robot cleaner or may be positioned on any one of left and right sides of the robot cleaner. In the latter case, the moving robot may further include a balance weight to resolve bias in weight of the battery.

The driving unit 130 may include a motor and drive the motor to rotate left and right main wheels of the main body of the moving robot in both directions to rotate or move the main body. The driving unit 130 may move the main body of the moving robot forwards/backwards and leftwards/rightwards, or enable the main body of the moving robot to travel in a curved manner or rotate in place.

The input unit 120 may receive various control commands regarding the robot cleaner from a user. The input unit 120 may include one or more buttons, for example, an OK button, a setting button, and the like. The OK button may receive a command to check detection information, obstacle information, position information, and map information from the user, and the setting button may receive a command to set the aforementioned types of information from the user.

The input unit 120 may include an input resetting button to cancel a previous user input and receive a user input again, a delete button to delete a preset user input, a button to set or change an operation mode, or a button to receive a command to return to the charging station. The input unit 120 may be installed in an upper portion of the moving robot, as a hard key, a soft key, or a touch pad. The input unit 120 may have a form of a touch screen together with the output unit 150.

Meanwhile, the output unit 150 may be installed in or at an upper portion of the moving robot. An installation position or an installation form thereof may be varied. For example, the output unit 150 may display a battery state or a traveling scheme.

The output unit 150 may output information regarding a state of an interior of the moving robot detected by the sensor 140, for example, a current state of each component included in the moving robot. The output unit 150 may display external state information, obstacle information, position information, and map information detected by the sensor 140 on a screen. The output unit 150 may be configured as at least one device among a light emitting diode (LED), a liquid crystal display (LCD), a plasma display panel (PDP), an organic light emitting diode (OLED).

The output unit 150 may further include a sound output unit (or sound output) audibly outputting an operational process or an operation result of the moving robot performed by the controller 180. For example, the output unit 150 may output a warning sound outwardly according to a warning signal generated by the controller 180.

The sound output unit may output a sound, such as a beeper, a speaker, and the like, and the output unit 150 may output audio data or message data having a predetermined pattern stored in the memory 170 through the sound output unit. Thus, the moving robot according to an embodiment may output environment information regarding a traveling region on a screen or output it as a sound through the output unit 150. Also, according to another embodiment, the moving robot may transmit map information or environment information to a terminal device through the communication unit 110 such that the terminal device may output a screen or a sound to be output through the output unit 150.

The communication unit 110 may be connected to the terminal device and/or a different device positioned within a specific region (which will be used together with a "home appliance" in this disclosure) according to one communication scheme among wired, wireless, and satellite communication schemes to transmit and receive data. The communication unit 110 may transmit and receive data to and from a different device positioned within a specific region. Here, the different device may be any device as long as it can be connected to a network and transmit and receive data. For example, the different device may be an air-conditioner, a heating device, an air purifier, a lamp, a TV, an automobile, and the like. The different device may also be a sensor sensing a temperature, humidity, atmospheric pressure, a gas, and the like.

Meanwhile, the memory 170 may store a control program controlling or driving the robot cleaner and data corresponding thereto. The memory 170 may store audio information, image information, obstacle information, position information, map information, and the like. Also, the memory 170 may store information related to a traveling pattern.

As the memory 170, a non-volatile memory may be commonly used. Here, the non-volatile memory (NVM) (or NVRAM) may be capable of continuously maintaining stored information even though power is not applied thereto. For example, the memory 170 may be a ROM, a flash memory, a magnetic computer storage device (for example, a hard disk or a magnetic tape), an optical disk drive, a magnetic RAM, a PRAM, and the like.

The sensor 140 may include at least one of an external signal sensor, a front sensor, and a cliff sensor. The external signal sensor may sense an external signal of the moving robot. The external signal sensor may be, for example, an infrared sensor, an ultrasonic sensor, an RF sensor, or the like.

The moving robot may check a position and a direction of the charging station upon receiving a guide signal generated by the charging station using the external signal sensor. The charging station may transmit the guide signal indicating a direction and a distance such that the moving robot may be returned. Upon receiving the signal transmitted from the charging station, the moving robot may determine a current position and set a movement direction to return to the charging station.

The front sensor may be installed at a predetermined interval on a front side of the moving robot, specifically, along an outer circumferential surface of a side surface of the moving robot. The front sensor may be positioned on at least one side surface of the moving robot to sense an obstacle ahead. The front sensor may sense an object, in particular, an obstacle, present in a movement direction of the moving robot and transfer detection information to the controller 180. The front sensor may sense a protrusion present in a movement path of the moving robot, furnishings, furniture, a wall surface, a wall corner, or the like, in a house, and transmit corresponding information to the controller 180.

The front sensor may be, for example, an infrared sensor, an ultrasonic sensor, an RF sensor, a geomagnetic sensor, or the like, and the moving robot may use a type of sensor or two or more types of sensors together as the front sensor. For example, in general, the ultrasonic sensor may be mainly used to sense an obstacle in a remote area. The ultrasonic sensor may include a transmission unit or module and a reception unit or module. The controller 180 may determine whether an obstacle is present according to whether an ultrasonic wave radiated through the transmission unit is reflected by an obstacle, or the like, and received by the reception unit, and calculate a distance to the obstacle by using an ultrasonic wave radiation time and an ultrasonic wave reception time.

The controller 180 may detect information related to a size of an obstacle by comparing an ultrasonic wave radiated from the transmission unit and an ultrasonic wave received by the reception unit. For example, as a larger amount of ultrasonic waves is received by the reception unit, the controller 180 may determine that the size of the obstacle is larger.

In an embodiment, a plurality of ultrasonic sensors (for example, five ultrasonic sensors) may be installed on an outer circumferential surface of a front side of the moving robot. Preferably, the transmission units and the reception units of the ultrasonic sensors may be installed alternately on the front side of the moving robot.

The transmission units may be spaced apart from the center of the front side of the main body of the moving robot, and in this case, one or two or more transmission units may be positioned between reception units to form a reception region of an ultrasonic signal reflected from the obstacle, or the like. Due to this disposition, a reception region may be expanded, while reducing the number of sensors. A transmission angle of ultrasonic waves may be maintained at an angle of a range which does not affect other signals to prevent a crosstalk phenomenon. Also, reception sensitivity of the reception units may be set to be different.

The ultrasonic sensors may be installed upwardly at a predetermined angle such that ultrasonic waves generated by the ultrasonic sensors are output upwardly, and in this case, in order to prevent the ultrasonic waves from being radiated downwardly, a predetermined blocking member may be further provided. As mentioned above, two or more types of sensors may be used as the front sensors, and thus, one or more types of sensor among an infrared sensor, an ultrasonic sensor, and an RF sensor may be used as the front sensors. The front sensor may include an infrared sensor as a different type of sensor, in addition to the ultrasonic sensor.

The infrared sensor may be installed on an outer circumferential surface of the moving robot together with the ultrasonic sensor. The infrared sensor may also sense an obstacle present in front of or by the side of the moving robot and transmit corresponding obstacle information to the controller 180. The infrared sensor may sense a protrusion present in a movement path of the moving robot, furnishings, furniture, a wall surface, a wall corner, and the like, in a house, and transmit corresponding information to the controller 180. Thus, the moving robot may move within a cleaning area without colliding with an obstacle.

As the cliff sensor, various types of optical sensors may be used, and the cliff sensor may sense an obstacle of the floor supporting the main body of the moving robot. The cliff sensor may be installed on a rear surface of the moving robot 100 and may be installed in different regions depending on a type of a moving robot. The cliff sensor may be positioned on a rear surface of the moving robot to sense an obstacle on the floor. The cliff sensor may be an infrared sensor including a light emitting unit or device and a light receiving unit or module, an ultrasonic sensor, an RF signal, a position sensitive detector (PSD) sensor, or the like, like the obstacle sensor.

Any one of cliff sensors may be installed on the front side of the moving robot, and the other two cliff sensors may be installed on a rear side. The cliff sensor may be a PSD sensor or may include a plurality of different types of sensor.

The PSD sensor may detect the positions of the short and long distances of an incident light with a single p-n junction by using the surface resistance of a semiconductor. The PSD sensor may include a 1D PSD sensor that detects light on a single axis and a 2D PSD sensor that may detect the position of light on the surface, and each may have a pin photodiode structure. The PSD sensor may be a type of infrared sensor which transmits an infrared ray to an obstacle and measures an angle between the infrared ray transmitted to the obstacle and infrared ray returned after being reflected from the obstacle, thus measuring a distance therebetween. The PSD sensor may calculate a distance to the obstacle using triangulation.

The PSD sensor may include a light emitting unit emitting infrared light to an obstacle and a light receiving unit receiving infrared light returned after being reflected from the obstacle. In general, the PSD sensor may be a module. In a case in which an obstacle is sensed by using the PSD sensor, a stable measurement value may be obtained regardless of difference in reflectivity or color of the obstacle. The controller 180 may measure an angle between an infrared light emitting signal irradiated by the cliff sensor toward the floor and a reflection signal received after being reflected from the obstacle to sense a cliff, and analyze a depth thereof. The controller 180 may determine whether the moving robot may be able to pass through a cliff according to a floor state of the cliff sensed by using the cliff sensor. For example, the controller 180 may determine whether a cliff is present and a depth of the cliff through the cliff sensor and only when a reflection signal is sensed by the cliff sensor, the controller 180 may allow the moving robot to pass through the cliff. In another example, the controller 180 may determine whether the moving robot is lifted using the cliff sensor.

A lower camera sensor may be provided on a rear surface of the moving robot and obtain image information regarding a lower side, namely, the floor (or a surface to be cleaned) during movement. The lower camera sensor provided on the rear surface may be defined as a lower camera sensor and may also be called an optical flow sensor. The lower camera sensor may convert an image of the lower side input from an image sensor provided therein to generate a predetermined format of image data. The generated image data may be stored in the memory 170.

One or more light sources may be installed to be adjacent to an image sensor. One or more light sources may irradiate light to a predetermined region of the floor captured by the image sensor. Namely, in a case in which the moving robot moves a cleaning region along the floor, when the floor is smooth, a predetermined distance may be maintained between the image sensor and the floor. On the other hand, in a case in which the moving robot moves on a floor which is uneven, the image sensor may become away from the floor by a predetermined distance or greater due to depressions and protrusions and an obstacle of the floor. In this case, the one or more light sources may be controlled by the controller 180 such that an amount of irradiated light can be adjusted. The light sources may be a light emitting device, for example, a light emitting diode (LED), or the like, whose amount of light can be adjusted.

The controller 180 may detect a position of the moving robot regardless of whether the moving robot slides by using the lower camera sensor. The controller 180 may compare and analyze image data captured by the lower camera sensor over time to calculate a movement distance and a movement direction, and calculate a position of the moving robot on the basis of the calculated movement distance and the movement direction. By using the image information regarding the lower side of the moving robot using the lower camera sensor, the controller 180 may perform correction resistant to sliding with respect to a position of the moving robot calculated by other means.

An upper camera sensor may be installed to face an upper side or a front side of the moving robot to capture images around the moving robot. When the moving robot includes a plurality of camera sensors, the camera sensors may be formed at or in an upper portion or on a side surface of the moving robot at a predetermined distance or at a predetermined angle.

Meanwhile the upper camera sensor may face an upper side or front side of the moving robot to capture an image around the moving robot. When the moving robot has a plurality of upper camera sensors, the camera sensors may be provided on an upper portion or a side surface of the moving robot at a predetermined distance or at a predetermined angle.

Figure 2A:
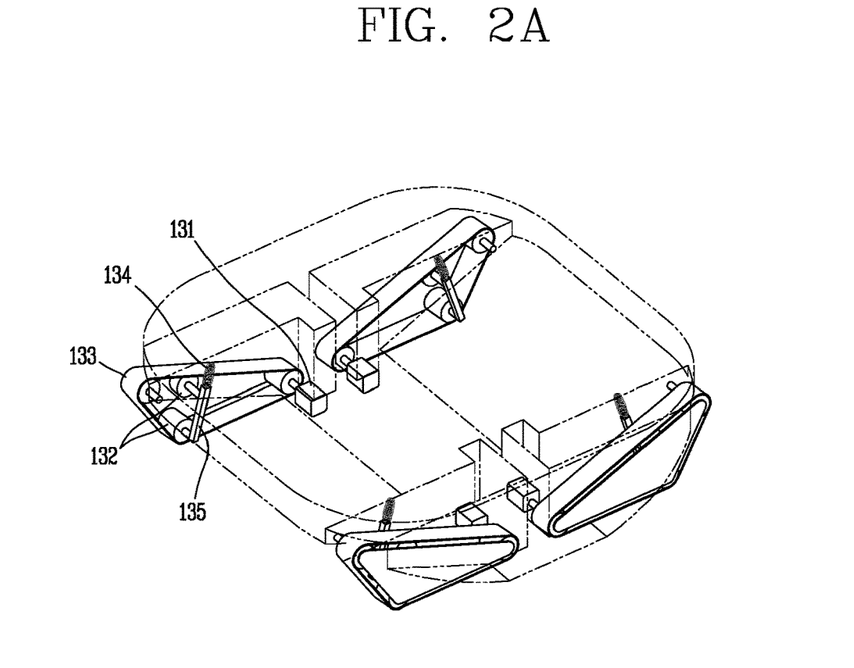
FIGS. 2A to 2C are conceptual views specifically illustrating a driving unit of a moving robot according to an embodiment of the present disclosure.
Figure 2B:
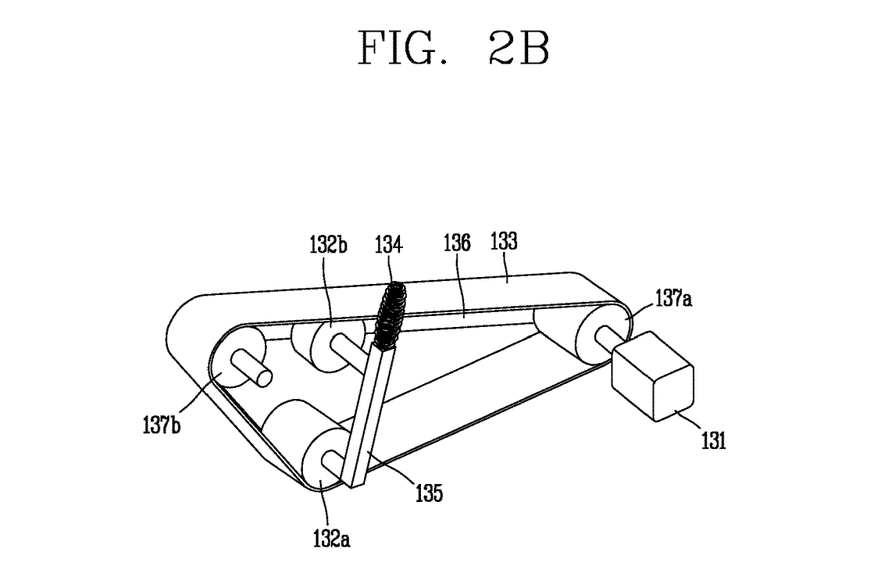

Referring to FIGS. 2A and 2B, the driving unit 130 may be formed as a belt or a caterpillar. As illustrated in FIG. 2A, the driving unit 130 may include a motor 131, a pulley 132, a belt 133, a support member (or support shaft) 135, and a spring member (or spring) 134.

In detail, the driving unit 130 may include a plurality of pulleys, and the motor 131 may be connected to any one of the plurality of pulleys to generate a driving force. For example, a pulley connected to the motor 131 may be a fixed pulley whose installation position is not changed. The plurality of pulleys may be fixed to a certain point of the main body or may be flexibly installed such that a relative position thereof with respect to the main body is changed. In this manner, the fixedly installed pulley may be provided on the front line or final line on the basis of a moving direction of the robot.

The belt 133 may be rotated, while being in contact with the plurality of pulleys provided in the driving unit 130. The support member 135 may be connected to some of the plurality of pulleys.

Referring to FIG. 2A, the support member 135 may be connected to some of the plurality of pulleys which are flexibly installed. The support member 135 may be connected to some of the plurality of pulleys which are not connected to the motor. The support member 135 may connect mutually facing pulleys.

In an embodiment, the support member 135 may change a position of a pulley such that an area in which the belt 133 is in contact with a ground or an obstacle is maintained to be equal or greater than a reference area. The reference area may be defined as a minimum area in which the belt 133 and a ground or an obstacle are in contact is in order to not to cause a slip between the belt 133 and the ground or the obstacle.

When the area in which the belt 133 being rotated in contact with the floor surface of an obstacle is less than the reference area, a slip may occur between the belt 133 and the floor surface or the obstacle. Also, when the area in which the belt 133 being rotated in contact with the floor surface of an obstacle is equal to or greater than the reference area, the robot may pass through the floor surface or the obstacle in a state in which a slip does not occur between the belt 133 and the floor surface or the obstacle.

Thus, the reference area may be an area in which the belt 133 of the robot is in contact with the floor surface and the obstacle in order to provide a minimal frictional force to the robot such that a slip does not occur between the belt 133 and the floor surface or the obstacle. The reference area may be defined by multiplying a specific ratio value to an area value formed by an external surface of the belt 133 or may be defined as a predetermined absolute area value.

The support member 135 may change a position of the pulley such that an attack angle formed between the belt 133 and an obstacle is maintained with a preset angle range. According to the FIG. 2C, the attack angle θ is defined as an angle formed by a virtual line (V-Line) connecting a contact point (P) between the belt 133 and an obstacle and a center of a virtual circle 200 in contact with one surface of the belt 133, with respect to the ground. A frictional force applied to the belt 133 of the driving unit 130 may be increased as the attack angle θ is closer to 90 degrees.

Figure 2C:
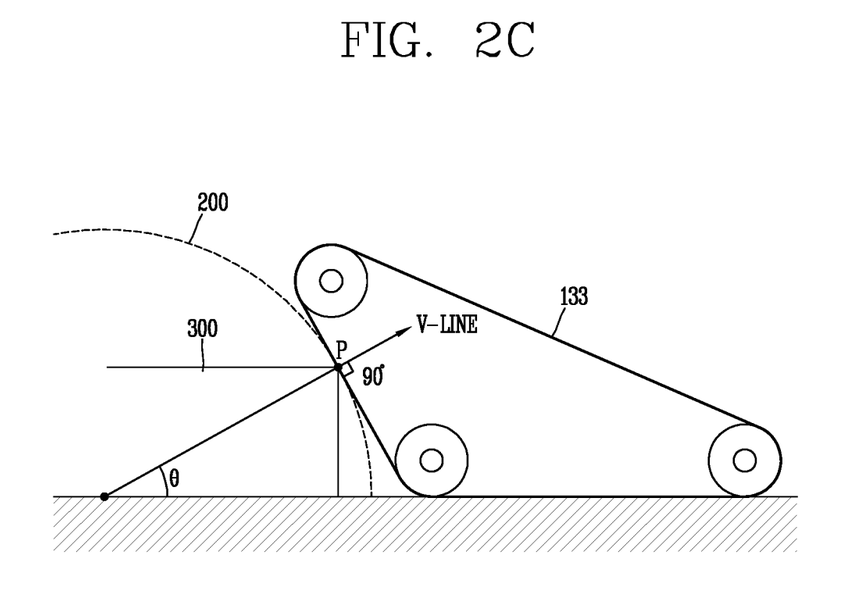

When the attack angle formed by the belt 133 being rotated with respect to the obstacle is not within the preset angle range, a slip may occur between the belt 133 and the ground or the obstacle. When the attack angle formed by the belt 133 being rotated with respect to the obstacle is within the preset angle range, the robot may pass through the ground or over the obstacle in a state in which a slip does not occur between the belt 133 and the ground or the obstacle.

The support member 135 may adjust a shape of a polygon formed by the belt 133 such that an area in which the belt 133 is in contact with the ground or the obstacle is maintained to be equal to or greater than the reference area. The support member 135 may change a position of the pulley such that torque applied to the belt 133 is maintained to be within a reference torque range.

The spring member 134 may be connected to a portion of the support member 135 and the main body. The spring member 134 may perform a buffering operation with respect to the driving unit 130 from an external impact or may move the support member 135.

A specific embodiment of the driving unit illustrated in FIG. 2A will be described with reference to FIG. 2B. Referring to FIG. 2B, the driving unit 130 may include a first pulley 137a connected to the motor 131, a second pulley 137b facing the first pulley 137a, and a third pulley 132a and a fourth pulley 132b connected to the support member.

In detail, the first pulley 137a may be connected to the motor 131 to directly receive a driving force from the motor 131. The first pulley 137a may be fixed. Also, the second pulley 137b facing the first pulley 137a may be fixed.

Meanwhile, the third and fourth pulleys 132a and 132b connected to the support member 135 may be flexibly installed such that an installation position is changed. In response to an external force applied to the driving unit 130, a length and a position of the support member 135 and an angle of the support member 135 with respect to the main body may be changed.

In addition, the support member 135 may change a position of the pulley in response to the external force, independently of the driving unit 130 and the controller 180 controlling an operation of the cleaning unit. The support member 135 may be formed of an elastic material. The support member 135 may be formed such that a length thereof is changed.

Accordingly, the length of the support member 135 may be changed according to a change in an external force applied to the driving unit 130. The length of the support member 135 may be passively changed by an external force independently from a control signal from the controller 180.

One point of the support member 135 may be fixed to the main body, and the support member 135 may be installed to be rotatable on the basis of the one point of the main body. Accordingly, an angle between the support member 135 and the main body may be passively changed according to an external force applied to the driving unit 130.

A length of the spring member 134 may be changed according to a change in an external force applied to the driving unit 130. A length of the spring member 134 may be passively changed by an external force independently from a control signal from the controller 180. In this case, a distance between the third and fourth pulleys may be fixed by the support member 135.

Although not shown in FIG. 2B, the driving unit 130 may have a plurality of support members 135. The driving unit 130 illustrated in FIG. 2B may have four pulleys, and in this case, the driving unit 130 may include one support member 135. However, the driving unit 130 may have six or more pulleys, and in this case, the driving unit 130 may include two or more support members 135.

A restoring member applying a restoring force to an initial installation position may be provided in the pulleys or the support member of the driving unit 130. A limiting member 136 limiting a movement range from the initial installation position may be provided in the pulleys or the support member of the driving unit 130.

Figure 3A:
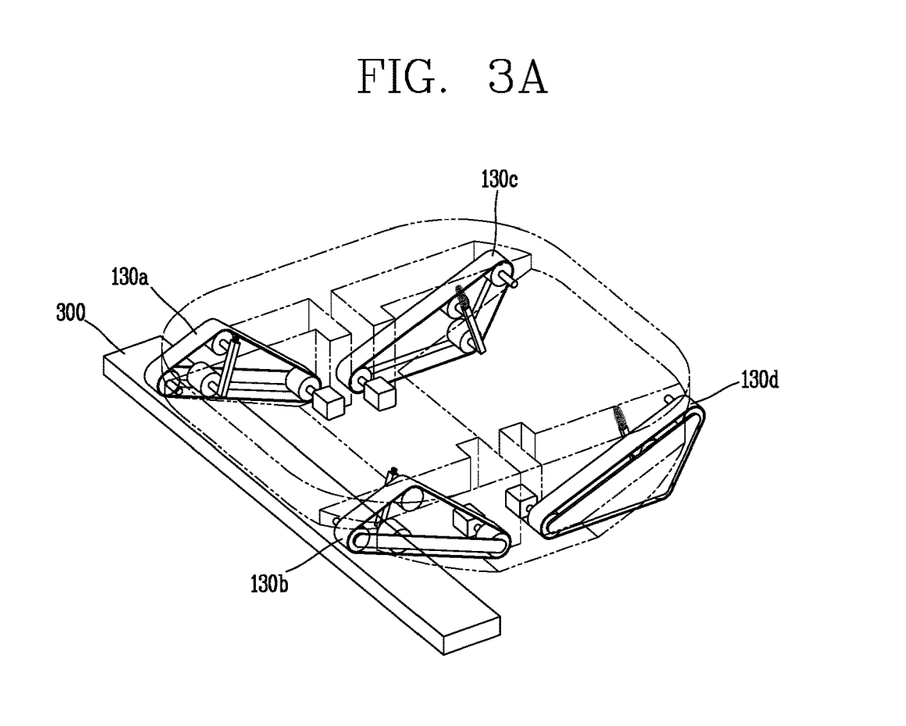
FIGS. 3A to 3C are conceptual views specifically illustrating a driving unit of a moving robot according to an embodiment of the present disclosure.

Hereinafter, an embodiment related to an operation of the driving unit 130 when the driving unit 130 is in contact with an obstacle 300 will be described with reference to FIGS. 3A and 3B. Referring to FIG. 3A, a length of a spring member 134 of a first driving unit 130a and a second driving unit 130b in contact with the obstacle 300 may be different from a length of a spring member 134 of a third driving unit 130c and a fourth driving unit 130d not in contact with the obstacle 300. As illustrated in FIG. 3A, a length of the spring member 134 of the first driving unit 130a and the second driving unit 130b in contact with the obstacle 300 may be shorter than the length of the spring member 134 of the third driving unit 130c and the fourth driving unit 130d not in contact with the obstacle 300.

Figure 3B:
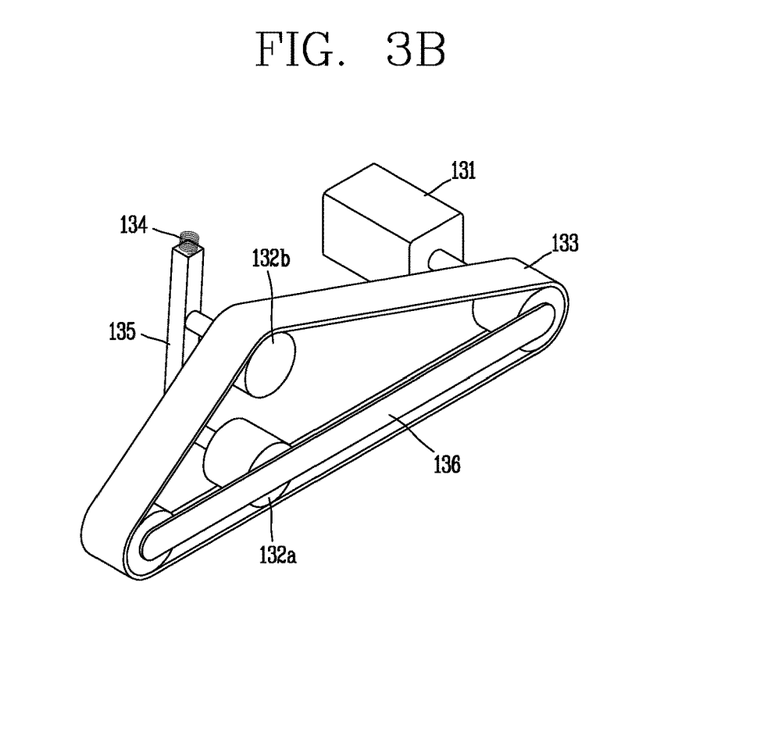

Specific components of the driving unit 130 in contact with the obstacle 300 are illustrated in FIG. 3B. For reference, the driving unit 130 not in contact with the obstacle 300 is illustrated in FIG. 2B described above.

When a position of the support member 135 of FIG. 2B and a position of the support member 135 of FIG. 3B are compared, the support member 135 of the driving unit 130 in contact with the obstacle 300 may be moved upwardly, relative to the support member 135 of the driving unit 130 not in contact with the obstacle 300. When an external force is applied to the driving unit 130, a position of the support member 135 may be changed according to a reduction in a length of the spring member 134.

Figure 3C:
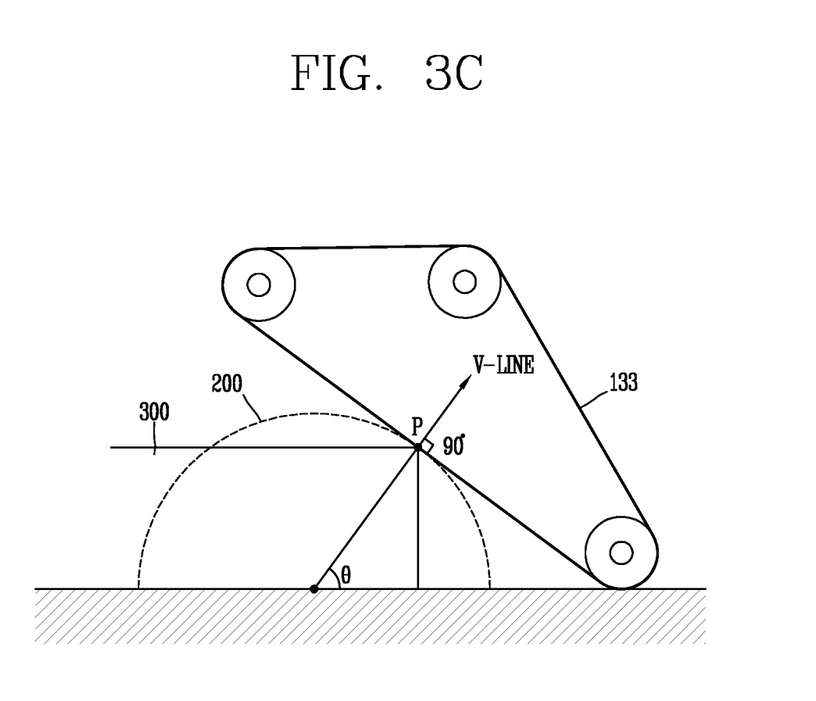

According to FIG. 3C, the attack angle θ is defined as an angle formed by a virtual line (V-Line) connecting a contact point (P) between the belt 133 and an obstacle and a center of a virtual circle 200 in contact with one surface of the belt 133, with respect to the ground. A frictional force applied to the belt 133 of the driving unit 130 may be increased as the attack angle θ is closer to 90 degrees.

Meanwhile, although not shown in FIGS. 2B and 3B, a binding member binding the third and fourth pulleys 132a and 132b and the limiting member 136 may be provided on one surface of the third pulley 132a and the fourth pulley 132b, and a movement range of the third and fourth pulleys may be limited by the binding member. The limiting member 136 may be a rod coupled to the first and second pulleys which are fixedly installed, and the third and fourth pulleys may include a binding member formed to have a hook shape that may be caught by the limiting member 136. For example, a direction in which the binding member of the third pulley is installed and a direction in which the binding member of the fourth pulley is installed may be opposite to each other.

Meanwhile, the controller 180 may control an operation of the driving unit 130 on the basis of information related to an obstacle or the ground sensed by the sensor. For example, the sensor may be a vision sensor such as a camera or may be an ultrasonic sensor. The sensor may also be a camera generating 3D information.

The controller 180 may change at least one of a length of the support member 135, a position of the support member 135, and an angle between the support member 135 and the main body on the basis of information sensed by the sensor. The information sensed by the sensor may include information related to at least one of a height, a surface, and a shape of an obstacle positioned in a moving direction of the main body. The sensor may sense information related to tension of the belt, and in this case, the controller 180 may control the driving unit to maintain tension of the belt to be equal to or greater than reference tension on the basis of the information sensed by the sensor.

Figure 4:
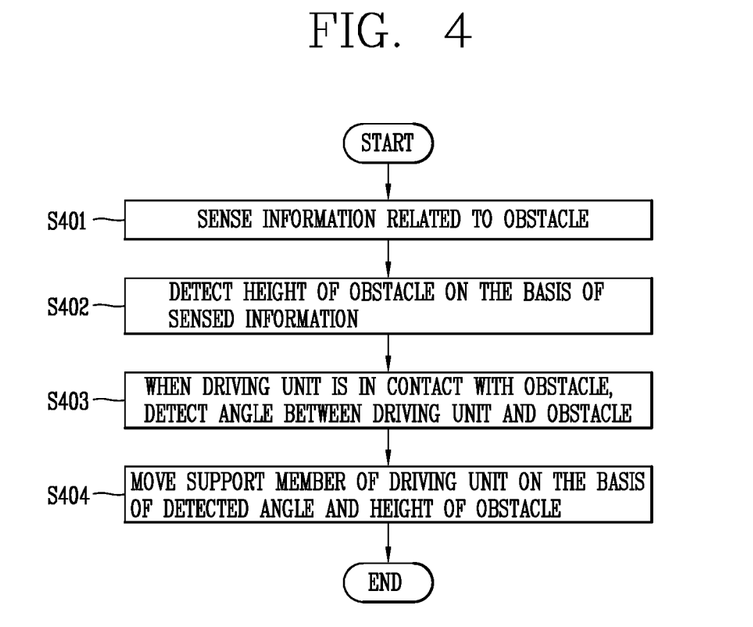
FIG. 4 is a flow chart illustrating an embodiment related to a control method of a moving robot according to the present disclosure.

FIG. 4 illustrates an embodiment related to a method for controlling an operation of the driving unit 130 according to a control signal from the controller 180. The sensor of the moving robot may be positioned in a moving direction of the robot or may sense information related to an obstacle positioned near the robot (S401).

The controller 180 may detect a height of the obstacle on the basis of the information sensed by the sensor (S402). The controller 180 may determine whether the driving unit 130 is in contact with the obstacle on the basis of the information sensed by the sensor. When the driving unit 130 is in contact with the obstacle, the controller 180 may detect an angle between the obstacle and the driving unit 130 (S403).

The controller 180 may move the driving shaft of the driving unit 130 or the support member 135 on the basis of at least one of the height of the obstacle and the detected angle (S404). When at least one of a plurality of wheels idly rotates while the robot is passing through a bottom surface having various conditions, the robot may escape from the idle rotation state using a driving force independently of the main wheel.

When at least one of a plurality of wheels is arrested by an obstacle while the robot is passing through a bottom surface having various conditions, the robot may escape from the arrested state using a driving force independently of the main wheel. Since a rough area moving performance may be enhanced by adding a simple device to the driving unit without attaching a separate sensor to the robot, moving performance of the robot may be significantly enhanced at low cost.

The robot having wheels may easily move in a rough area. When a cleaning area is a rough area, even when an obstacle is present in the cleaning area, cleaning efficiency of the robot may be enhanced.

A moving robot may include a caterpillar type driving unit moving a main body, while maintaining an area equal to or greater than a reference area with respect to a ground or an obstacle. The moving robot may include: a main body; a driving unit moving the main body; and a cleaning unit performing cleaning on a cleaning area in which the main body is positioned.

The driving unit may include a plurality of pulleys; a motor connected to any one of the plurality of pulleys and generating a driving force; a belt rotated in contact with the plurality of pulleys; and a support member connected to some of the plurality of pulleys and changing a position of the pulley such that an area in which the belt is in contact with a ground or an obstacle is maintained to be equal to or greater than a reference area. When the area in which the belt is in contact with the ground or the obstacle is equal to or greater than the reference area, the main body may pass through the ground or the obstacle without causing a slip to occur between the belt and the ground or the obstacle.

In response to an external force applied to the driving unit, at least one of a length of the support member, a position of the support member, and an angle between the support member and the main body may be changed. The moving robot may further include a controller controlling an operation of the driving unit and the cleaning unit, wherein the support member may change a position of the pulley in response to the external force, independently of the controller.

The support member may be formed of an elastic material, and a length of the support member may be changed according to a change in the external force. One point of the support member may be fixed to the main body, and the support member may be installed to be rotatable on the basis of the one point according to a change in the external force.

The moving robot may further include: a sensor sensing information related to the ground or the obstacle; and a controller controlling the driving unit on the basis of the information sensed by the sensor. The controller may change at least one of a length of the support member, a position of the support member, and an angle between the support member and the main body on the basis of the information sensed by the sensor.

The information sensed by the sensor may include information related to at least one of a height, a surface, and a shape of an obstacle positioned in a moving direction of the main body. The sensor may sense information related to tension of the belt, and the controller may control the driving unit to maintain tension of the belt to be equal to or greater than reference tension on the basis of the information sensed by the sensor.

The driving unit may further include: a spring member connected to each of a portion of the support member and the main body. The support member may be connected to each of pulleys facing each other among the plurality of pulleys. The driving unit may include a plurality of support members.

A moving robot may include a main body; a driving unit moving the main body; and a cleaning unit performing cleaning on a cleaning area in which the main body is positioned, wherein the driving unit may include: a plurality of pulleys; a motor connected to any one of the plurality of pulleys and generating a driving force; a belt rotated in contact with the plurality of pulleys; and a support member connected to some of the plurality of pulleys and changing a position of the pulley such that an attack angle between the belt and an obstacle is maintained to be within a preset angle range, and when the attack angle between the belt and the obstacle is included in the preset angle range, the main body passes through the obstacle without causing a slip to occur between the belt and the obstacle.

A moving robot may include a main body; a driving unit moving the main body; and a cleaning unit performing cleaning on a cleaning area in which the main body is positioned, wherein the driving unit may include: a plurality of pulleys; a motor connected to any one of the plurality of pulleys and generating a driving force; a belt rotated in contact with the plurality of pulleys; and a support member connected to some of the plurality of pulleys and adjusting a shape of a polygon formed by the belt such that an area in which the belt is in contact with a ground or an obstacle is maintained to be equal to or greater than a reference area, wherein when the area in which the belt is in contact with the ground or the obstacle is equal to or greater than the reference area, the main body may pass through the ground or the obstacle without causing a slip to occur between the belt and the ground or the obstacle.

When at least one of a plurality of wheels idly rotates while the robot is passing through a bottom surface having various conditions, the robot may escape from the idle rotation state using a driving force independently of the main wheel. When at least one of a plurality of wheels is arrested by an obstacle while the robot is passing through a bottom surface having various conditions, the robot may escape from the arrested state using a driving force independently of the main wheel.

Since a rough area moving performance may be enhanced by adding a simple device to the driving unit without attaching a separate sensor to the robot, moving performance of the robot may be significantly enhanced at low cost. The robot having wheels may easily move a rough area.

When a cleaning area is a rough area, even when an obstacle is present in the cleaning area, cleaning efficiency of the robot may be enhanced. Since the robot can pass through an obstacle without an auxiliary wheel unlike the related art robot, manufacturing cost and weight of the robot may be reduced and power efficiency of the robot may be increased, compared with the related art robot. Since a width of the main body of the robot is reduced, the robot may easily pass through an obstacle, compared with the related art robot.

Further scope of applicability of the present application will become more apparent from the detailed description given hereinafter. However, it should be understood that the detailed description and specific examples, while indicating preferred embodiments of the invention, are given by way of illustration only, since various changes and modifications within the scope of the invention will become apparent to those skilled in the art from the detailed description.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A moving robot performing automatic traveling, the moving robot comprising:
    a main body;
    a drive assembly moving the main body;
    a sensor provided in the main body and configured to sense information related to a surface area or an obstacle;
    a controller configured to control the drive assembly on the basis of the information sensed by the sensor; and
    a cleaner head to clean the surface area,
    wherein the drive assembly includes:
        a plurality of pulleys;
        a motor connected to any one of the plurality of pulleys and generating a driving force;
        a belt in contact with and configured to rotate along the plurality of pulleys; and
        a support shaft connected to at least two of the plurality of pulleys and configured to change a position of the at least two of the plurality of pulleys such that an area in which the belt is in contact with the surface area or the obstacle is equal to or greater than a reference area, and when the area in which the belt is in contact with the surface area or the obstacle is equal to or greater than the reference area, the main body passes along the surface area or over the obstacle to prevent slippage between the belt and the surface area or the obstacle,
    wherein, in response to an external force applied to the drive assembly, at least one of a length of the support shaft, a position of the support shaft, and an angle between the support shaft and the main body is changed.

2. The moving robot of claim 1, wherein the support shaft changes a position of the at least two of the plurality of pulleys in response to the external force, independently of the controller.

3. The moving robot of claim 2, wherein the support shaft is formed of an elastic material, and a length of the support shaft is changed according to a change in the external force.

4. The moving robot of claim 2, wherein a first point of the support shaft is fixed to the main body, and the support shaft is installed to be rotatable on the basis of the first point according to a change in the external force.

5. The moving robot of claim 1, wherein the controller changes at least one of a length of the support shaft, a position of the support shaft, and an angle between the support shaft and the main body on the basis of the information sensed by the sensor.

6. The moving robot of claim 5, wherein the information sensed by the sensor includes information related to at least one of a height, a surface, and a shape of the obstacle positioned in a moving direction of the main body.

7. The moving robot of claim 6, wherein the sensor senses information related to tension of the belt, and the controller controls the drive assembly to maintain tension of the belt to be equal to or greater than a reference tension on the basis of the information sensed by the sensor.

* * * * *